United States Patent [19]
Weiser et al.

[11] Patent Number: 5,485,634
[45] Date of Patent: Jan. 16, 1996

[54] METHOD AND SYSTEM FOR THE DYNAMIC SELECTION, ALLOCATION AND ARBITRATION OF CONTROL BETWEEN DEVICES WITHIN A REGION

[75] Inventors: Mark D. Weiser, Palo Alto; Richard J. Goldstein, San Francisco; Roy Want; Brent B. Welch, both of Mountain View; Scott A. Elrod, Redwood City; David A. Maltz, Mountain View; William N. Schilit, Palo Alto; Marvin M. Theimer, Mountain View, all of Calif.

[73] Assignee: Xerox Corporation, Stamford, Conn.

[21] Appl. No.: 166,478

[22] Filed: Dec. 14, 1993

[51] Int. Cl.$^6$ .............................. H04B 1/38; H04B 17/00
[52] U.S. Cl. ...................... 455/53.1; 455/54.1; 455/67.1
[58] Field of Search ................................. 455/53.1, 54.1, 455/54.2, 56.1, 58.1, 66, 68, 70, 67.1, 33.1; 379/59, 63, 61; 370/85.1, 85.7, 95.1, 85.2; 340/825.22, 825.3, 825.31, 825.34, 825.38, 825.5

[56] References Cited

U.S. PATENT DOCUMENTS

| | | | |
|---|---|---|---|
| 5,210,788 | 5/1993 | Nilssen | 379/61 |
| 5,271,007 | 12/1993 | Kurahashi et al. | 370/85.1 |
| 5,311,585 | 5/1994 | Armstrong et al. | 379/221 |
| 5,313,653 | 5/1994 | Sasuta | 455/17 |
| 5,355,520 | 10/1994 | Freeburg et al. | 455/53.1 |
| 5,386,455 | 1/1995 | Cooper | 379/58 |

*Primary Examiner*—Reinhard J. Eisenzopf
*Assistant Examiner*—Lee Nguyen

[57] ABSTRACT

A system is provided for servicing requests by a mobile controller to utilize stationary or mobile resources present within a partitioned communication cell such as an office or room in a building. The mobile controller has a control signal mechanism for generating control request signals to modify behavior of the stationary or mobile resource, with the range of the control request signals substantially limited to the partitioned communication cell. A room agent receives and acts upon the control request signals after dynamically determining availability of both mobile resources entering and exiting the partitioned communication cell and stationary resources already present in the partitioned communication cell. In operation, the room agent is configured to grant requests for utilization of mobile and stationary resources located within the partitioned communication cell when predetermined contextual attributes within the partitioned communication cell are consistent with previously specified interaction policies.

2 Claims, 10 Drawing Sheets

| | Board | Sparc Workstation | Room Lighting | 5775 Printer | Black/White Printer |
|---|---|---|---|---|---|
| Word Processing | 6 | 10 | 0 | 1 | 0 |
| Graphics | 10 | 9 | 0 | 2 | 2 |
| Black and White Printing | 2 | 2 | 0 | 6 | 10 |
| Color Printing | 2 | 2 | 0 | 10 | 5 |
| Illumination | 1 | 1 | 10 | 0 | 0 |

*Fig. 4*

METHOD AND SYSTEM FOR THE DYNAMIC SELECTION, ALLOCATION AND ARBITRATION OF CONTROL BETWEEN DEVICES WITHIN A REGION

FIELD OF THE INVENTION

The present invention relates in general to a method and a system for allowing certain devices to control other devices and, in particular, to a method and a system for the dynamic selection, allocation and arbitration of control of devices within a proximal region.

BACKGROUND OF THE INVENTION

The usefulness of any given device is determined in part by the degrees of freedom provided by the control mechanisms for the device. For example, a light that merely has an on/off switch is not as versatile as a light that allows an entire range of illumination through a dimmer switch. Systems that supply a wide range of control options and mechanisms are generally more desirable from a user's standpoint.

Conceptually, controllers may be broken down into a variety of broad categories. Controllers may either be physically attached to the controlled device or they may be remote and control the device from a distance. Controllers may be either dedicated to control a single device or adaptable to control a variety of different devices. Remote, adaptable controllers generally allow the user a greater range of use than dedicated, attached controllers. From across the room, a viewer is able to switch channels on a television set with a dedicated remote controller without physical exertion. Such a viewer might be better served by an adaptable controller that could also control other devices such as lighting, room temperature, stereo, and the like.

As user environments become more complex, the need for more versatile control mechanisms becomes greater. Users would like to feel that the devices at their disposal exist to aid them in their tasks—not monopolize their attention. In a sense, the best controller is one that provides the user the greatest range of functionality without requiring a great deal of conscious effort. That is, the more the control features blend into the background or become tacit, the better.

Current environments that facilitate human interactions, such as workplaces, homes, airports, commercial areas and the like, have seen increasing complexity and automation. Today, a typical environment may include many resources such as workstations, telephones, televisions, stereos, radios, VCRs, fax machines, printers, copiers, scanners, modems, and the like. These relatively new computational and communication resources supplement other environmental resources typically found in work and living spaces, such as lighting, air conditioning and the like. It is desirable from a user standpoint that all of these devices work together to create an environment conducive to achieving the task at hand.

While today's office comprises a large collection of devices needing control, that collection promises to expand in the future. One vision of the future office is found in Dr. Mark Weiser's article "The Computer for the 21st Century" (Scientific American, September 1991 issue). Dr. Weiser describes a work place in which there would be literally hundreds of computers per room. These computers would be so well integrated into the office environment that their presence would not be consciously noted.

This "ubiquitous computing" paradigm envisions a hierarchy of integrated computers in terms of size and performance. At the lowest end, "Tabs" and "Badges", currently at a few inches square, are the smallest components of ubiquitous computing. Tabs and Badges perform basic functions in a ubiquitous computer setting. For example, Badges are worn by people inhabiting this type of environment. As a wearer of the Badge walks from room to room, the Badge would communicate to the room, through a wireless medium, the presence of the person. Automatically, the room might make adjustments for the person, such as calling up the person's desktop onto a computer workstation located in the room. Additionally, the building itself could keep account of an individual's movements. Phone calls could be forwarded to the room where the individual is located. Likewise, security doors would open up for certain individuals and not for others.

At the other end of the hierarchy, "Pads" and "Boards" are computers analogous to sheets of paper and blackboards respectively. These computers, together with Tabs, work interactively with each other to form a seamless web of computing in the work place. Typically, in any given room, hundreds of Tabs may work and communicate with ten or twenty Pads and one or two Boards. An implementation of a "ubiquitous computing" environment, as envisioned by Dr. Weiser, is discussed in greater detail in commonly assigned U.S. patent application Ser. No. 08/100,655, entitled "A METHOD AND SYSTEM FOR MAINTAINING PROCESSING CONTINUITY TO MOBILE COMPUTERS IN A WIRELESS NETWORK", filed Jul. 30, 1993 by Want et al., which is herein incorporated by reference. Want et al. disclose a basic wireless network architecture in which each mobile computer on the network has an agent. An agent is a process, resident on a host on the network, that is dedicated to serving the needs of the mobile unit. For example, the agent is responsible for knowing the location of its assigned mobile unit. Additionally, all communications routed to and from a mobile computer go through its agent.

In its broadest sense, a ubiquitous computing environment has many aspects that must be considered in order for it to provide a meaningful work environment for its users. For example, one aspect of a ubiquitous computing environment is the ability of one device to control another. Devices, in such an environment, can be subdivided into the broad classes of controllers and resources. The previously mentioned Tab, carried by a user from room to room, may serve as a remote, adaptable mobile controller for a wide range of resources within its environment. Mobile controllers may essentially function as a mobile user interface, permitting users to sense and control resources remotely. For example, it would be desirable for a Tab with a touch screen to connect to a room's thermostat and either display the current temperature or, at the user's request, adjust the thermostat to a desired temperature.

One implementation of a control allocation scheme is detailed in commonly assigned U.S. patent application Ser. No. 08/161,968 (file number as yet unassigned—Attorney Docket Number D793335), entitled "SELECTION, CONTROL AND OWNERSHIP OF PARTICULAR DEVICES IN A MULTIPLE COMPUTER SYSTEM BASED ON CONTEXT AND ENVIRONMENT IN PROXIMITY TO A USER OR DEVICE", filed on Dec. 3, 1993 by Theliner et al., which is herein incorporated by reference. Theimer et al. describe an environment populated by users and computational devices whereby control of devices by a particular user is made in the context of the user. User context is comprised of the user's immediate surroundings (e.g. what device and other users are proximal to the particular user) and the preferences and/or policies of the devices and user.

A typical scenario using Theimer et al.'s system might involve a user who wants to print a private document having special graphics embedded in it. Because the document is private, the user wants the document to be printed where ever the user is located and, further, to be printed only when no one else is around. Additionally, the printer must be able to handle the special graphics. Theimer et al.'s system would wait until the context specified in the request is satisfied in the environment before action is taken. Specifically, the system would locate the user and all printers proximal to the user that might satisfy the request. Additionally, the system would check to see if other users are proximal to the requesting user before granting the request.

The system as disclosed by Theimer et al. identifies user and device policies as constraints to be considered when granting requests. These policies may be implemented as a set of IF-THEN rules as the instructions of an inference engine. In such an implementation, if the current context of the environment satisfies the conditional, then the system executes the actions specified in the rule.

Limiting system constraints, however, to only users and devices policies does not necessarily lead to meaningful or conducive work environments for its users. Users normally interact with each other in ways which are conducive to accomplishing a collaborative task. More often than not, collaborative efforts take place within a certain proximity, such as someone's room or office. Typically, the resources located in the room are involved in performing the task. The users, attempting to perform the task, naturally seek to use these resources to effect a solution. Thus, requests from the various users for the room's resources will be competing and, in some cases, conflicting.

For example, suppose a group of users, located in an office room, are collaboratively working to complete a proposal for an architectural project. The various tasks involved in completing the proposal might include: wordprocessing, graphic display and manipulation, computation (e.g. for deciding budgeting), and printing. In Theimer et al.'s system, any and all users are free to "grab" resources at will and control them indefinitely. This possibility may hinder the collaborative work required to efficiently finish the project— one user might simultaneously control graphical and printing devices while not necessarily using either to its peak efficiency. Thus, a "greedy" user may make other users idle at some points during the task.

Likewise, if the proposal is to be written by one primary user with some input from others, it might be desirable from the primary user's standpoint to have a mechanism in place to have priority control over the devices in the room after sufficient input has been culled.

Part of the problem is that users and devices generally do not have a global (or even a regional) view of competing requests for resources. Without such a view, allocations of resources made to "greedy" controllers and/or users may actually hinder the collaborate nature of the work being done in a proximal region.

Thus, there is a need for a system which arbitrates user interactions and requests for resources and makes allocation decisions based upon proximal region policies that tend to aid multiple users engaged in collaborate tasks or in discrete tasks that require a sharing of resources to accommodate all users.

SUMMARY OF THE INVENTION

In summary, the present invention comprises a method and a system by which mobile, remote, adaptable controllers can dynamically control a multitude of resources within a given region (e.g. a room) such that policies determined for the region, controllers, and resources can be arbitrated in a manner that creates a conducive work environment for users in the region.

Furthermore, this method allows a controller to dynamically choose one of various modes of operation, either singly or in combination, allowing the user of the controller a maximum of flexibility in interacting with the resources in the region.

These modes of operation comprise, but are not limited, to the following:

a) A mode where information concerning the nature and state of all resources in the region is presented to the controller and which allows the user of the controller to select suitable resources to control until some further change in state.

b) A mode where the controller is engaged in a specific activity and seeks a resource to aid in that activity. The system chooses the most suitable, available resource in the region, given the region policy and other various constraints placed on the choice.

c) A mode where the controller lets it be known that it is available to be a controller for resources that are looking for controllers. The system finds the most suitable resource, among those currently looking for controllers to attach itself to the controller and to configure the controller for the purpose of having a user being able to control resource, while enforcing region policy.

This method maximizes the control of the resources of a region such that the control of the most suitable resources is dynamically situated in the hands of the user on an adaptable mobile controller.

One advantage of the present invention is the ability to allocate control of resources to controllers while maintaining the integrity and context of meaningful work environments.

Another advantage of the present invention is versatility. A user, moving from room to room, may assume control of available resources within the new environment, either automatically or by user request. The user need not have a separate controller for each such resource—a single controller is sufficient.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

FIG. 4 depicts a suitability matrix that is employed by one embodiment to determine the most suitable resource for a given request.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

The present invention provides services for matching resources to controllers over a constrained proximal region characterized by a dynamically changing set of controllers, resources and users. All three classes of inhabitants (resources, controllers, and users) may have some members that are stationary and some members that are mobile in the environment. Resources, though generally thought of as stationary, may be mobile. For example, resources may be relocatable to customize a user's workspace.

Likewise, some controllers may be stationary, such as a workstation, while other controllers are mobile. However, in order for an environment to be properly thought of as supporting ubiquitous computing, the environment must account for the mobility of the users. Human users walking around a workspace must have the ability to affect their surroundings automatically as they move room to room. Although the presently preferred embodiment of the present invention concerns itself chiefly with the interactions of mobile controllers, carried possibly by users, and resources, it will be appreciated that interactions between stationary controllers, used by mobile users, and resources may be similarly implemented.

Further, the distinction between a controller and a resource sometimes blurs in ubiquitous computing. Occasionally, a device normally considered a resource may act as a controller. For example, a Board is normally a resource that others may control remotely (e.g. to display and alter a graphic image). However, it is possible that control mechanisms for other devices, such as a room's lighting, may be displayed on the Board such that a user may control the device from the Board. In such a case, the Board acts as a controller making requests upon the lighting. Likewise, devices that are normally considered as controllers may act as resources. For the purposes of the present invention, whether a given device is a controller or a resource is context dependent. Broadly speaking, a device that is requesting control of another device may be considered a controller. A device that potentially may fulfill a request may be considered a resource.

Figure 1:
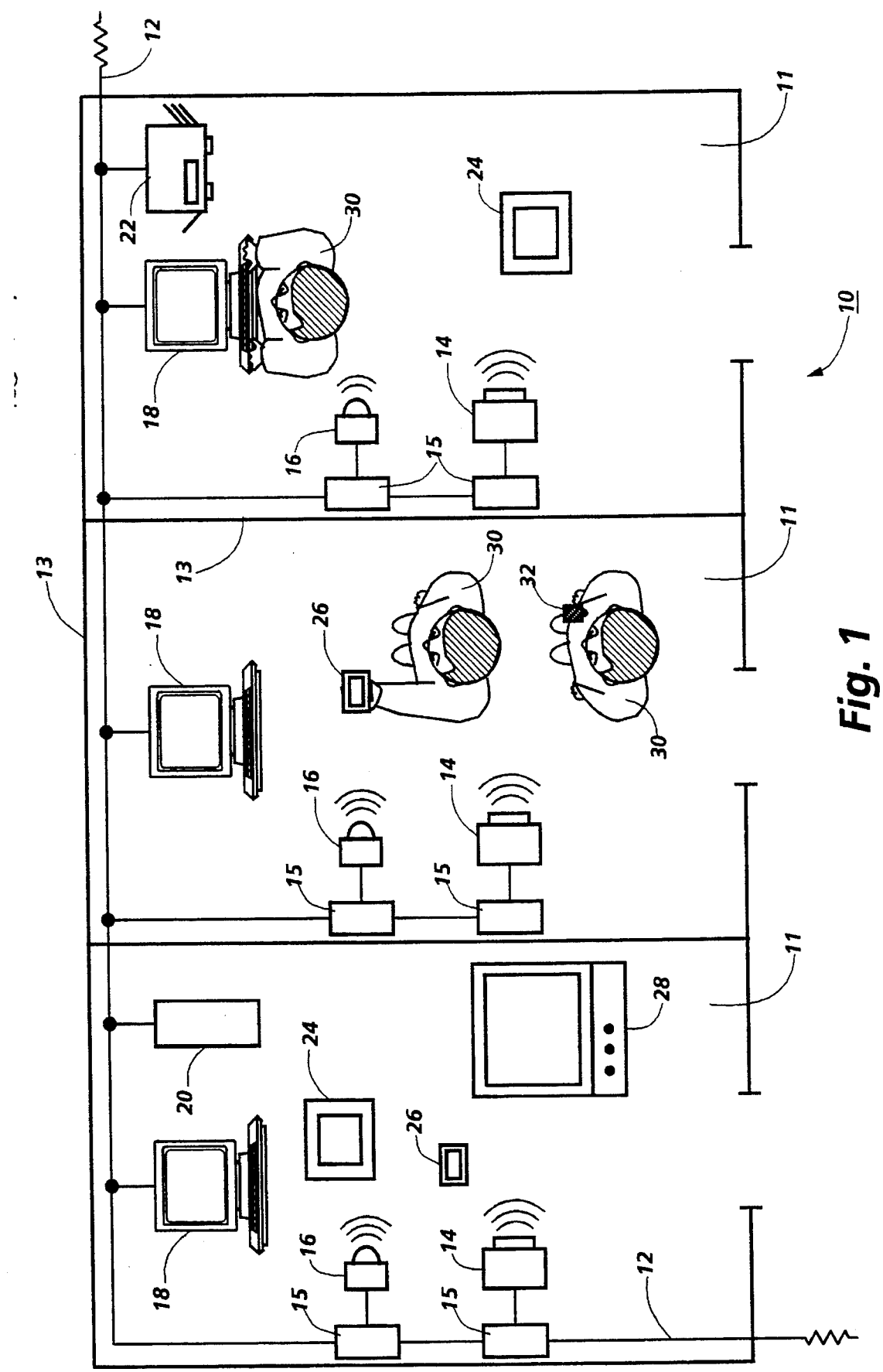
FIG. 1 depicts an environment where mobile units are connected to a network via wireless media and resources are connected to the network via a wired medium.

FIG. 1 depicts a workspace, suitable for the purposes of the present invention, that is inhabited by users, resources, and controllers. The various components that might be found in such a workspace comprise a hardwired network backbone 12, radio and infrared transceivers 14 and 16 respectively, workstations 18, file servers 20, printers 22, various mobile controllers (e.g. Pads 24, Tabs 26, etc.), Boards 28, and users 30.

Network backbone 12 provides high bandwidth communications between the various communication and computing devices. One present embodiment uses a 10 Mbps Ethernet that provides the basic infrastructure. It will be appreciated that although any network architecture may suffice for the backbone, it is desirable that the bandwidth be large enough to support a desired maximum number of devices for some desired performance criteria.

Components of this environment may be properly classified as either "stationary" or "mobile". Stationary components are generally "hardwired" (i.e. physically connected) to network backbone 12. At the current state of the art, such components comprise user workstations 18, file servers 20 and printers 22, and the like. It will be appreciated that other networkable components may be connected to the infrastructure depending upon the needs of the office.

Mobile communication and computer units connect to backbone 12 via radio and infrared transceivers 14 and 16 respectively. One advantage of using infrared as a medium is frequency reuse. Walls 13 are essentially opaque to infrared transmission. Thus, IR transmissions in one room do not interfere with IR transmissions in another. Individual rooms 11 are termed communication "cells" because of this effective partitioning. This useful property allows the reuse of the IR bandwidth for each cell in the workplace. It will be appreciated that the use of IR as a medium of wireless communication is well known in the art.

A similar communications partitioning is possible with a single radio frequency if the "near field" components produced by an antenna are used to couple the mobile units to the network. The term "near field" describes those field components of an energized antenna that do not give rise to propagating waves. The use of near field communication is disclosed in commonly assigned U.S. patent application No. 07/984,821 entitled "Wireless Communications Using Near Field Coupling" filed Dec. 3, 1992 by Richley et al. and is hereby incorporated by reference.

Each transceiver 14 or 16 in the present embodiment is connected to a network 12 through a base station, or gateway computer 15, which performs translation between the wireless communication from the transceiver and the communication packets sent over the network 12.

It will be appreciated that the use of IR and near field radio as media of wireless communication is well known in the art. Although only near field radio and infrared transmission are employed in the presently preferred embodiment, it will also be appreciated that other bands of the electromagnetic and acoustic spectrum might be suitable and that the present invention should not be limited to the use of the media herein specified. It will also be appreciated that multiple frequencies may be employed to partition the communication space into non-interfering cells. Additionally, mobile controllers as well as some resources) may be temporarily "tethered" to the network by directly connecting them to the network backbone.

Users 30 may have in their possession mobile devices that allow the user to automatically interact with their surroundings. Two such devices, Tab 26 and Badge 32, announce the presence of the user currently "owning" the device by broadcasting a suitable signal to the transceivers 14 or 16. Tab 26 may additionally have a touch screen or other user interface that allows a richer interaction with the user's surroundings than just announcing presence. Users 30 may not have any such mobile device in possession; but may nonetheless interact and have the user's surroundings automatically interact by simply logging onto a workstation 18.

In addition to the various controllable devices inhabiting a workspace, the notion of a "region" is useful to the present invention. A region is a proximal, physical or geographic region, such as a room, hallway, wing, building, or the like. A region is a partition that defines a single working context, inhabited by controllers, resources and users within its boundaries.

In the presently preferred embodiment, a "room" is the region level in which devices dynamically share control. Rooms are reasonable areas to define as regions because of the effective partitioning of the wireless communications between rooms. Additionally, rooms represent logical work or living spaces. It will be appreciated, however, that other physical areas (such as desktops, corridors, wings, entire buildings, etc.) are possible candidates for regions. Additionally, other partitions, both logical or physical, are possible.

Rooms contain resources that can be controlled or can control other devices. As mentioned above, examples of resources would be lighting systems, heating systems, Boards, workstations, cameras, monitors, telephones, fax machines and the like. Controllers, both stationary and mobile, make requests for services to be performed by a room's resources. Mobile controllers (referred to as "MC"s) periodically enter and leave rooms and their presence is made known to the room upon entry. As will be described below, mobile controllers and resources "register" with the room upon entering in the presently preferred embodiment.

Rooms also define the context of the interactions between users, controllers, and resources. The "context" of a room includes: the presence of users, controllers, and resources; the states of those users, controllers, and resources; interaction policies of users, controllers, resources, as well as the room itself; and the status of applications and requests that involve users, controllers, and resources located in the room. The context of a room dynamically varies over time—users, controllers, and resources may enter and leave at various times; requests for resources are made at various times, etc.

Rooms are the regions in which requests for control are serviced. To provide this service, one embodiment of the present invention assigns to each room in the workspace a dedicated process, called a "room agent". A room agent resides on one or more processors coupled to the network and has an address that is registered with a global name service. In addition to room agents, each controller and resource has its own agent which manages the communications and requests for control for its associated device.

It will be appreciated that although the present invention will be described in reference to this embodiment, there are other embodiments that could implement and enforce room-level policies, arbitrate requests, and allocate resources based on those requests. Such an alternate embodiment might involve a "multicast" communication scheme whereby all resources and controllers broadcast messages to the entire room. Room-level policies might be distributed among the various resources and controllers in the room and each device would use room-level policies as filters on their own actions and/or reactions, in addition to their own device-specific policies.

Figure 2:
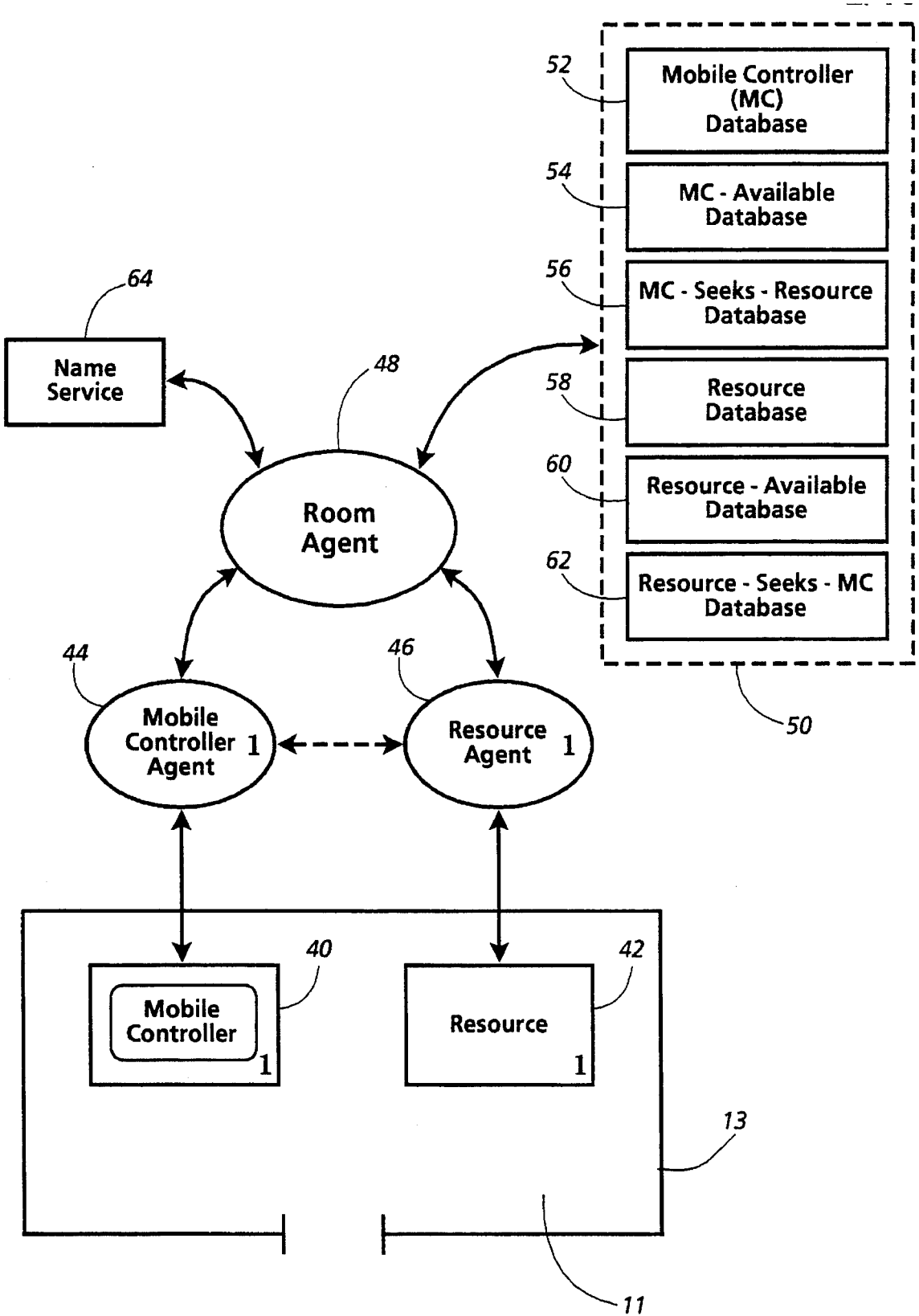
FIG. 2 depicts the overall architecture of an embodiment of the present invention.

FIG. 2 depicts the overall architecture of an embodiment employing a dedicated room agent. Room agent 48 communicates with mobile controller agents 44, resource agents 46, global name service 64, and a collection of databases 50.

The mobile controller agent 44 and resource agent 46 in turn communicate with their associated mobile controller 40 and resource 42 respectively. All communications take place upon the network through either the hardwired line 12 or wireless communication links or a combination thereof.

The collection of databases 50 comprises databases 52, 54, 56, 58, 60, and 62. These databases contain information about the resources and MCs currently within the room. In this embodiment, this information is periodically updated by the room agent by broadcasting a "who are you" message within the room. Those resources and MCs located within the room respond, if so able, and the databases are updated by the room agent. It will be appreciated, however, that other mechanisms for updating the database exist (such as devices that check in periodically) and that the present invention should not be limited to the mechanisms disclosed herein.

It will be further appreciated that the decision of a device to register itself as either a resource or a controller is made by the individual device. As previously mentioned, such a decision is dependent upon the state of the device. In some cases, a single device may register itself as both a resource and a controller, depending upon whether the device is capable of requesting resources or fulfilling such requests.

The databases also maintain certain state and type information about the devices. For example, the resource-available and MC-available databases 60 and 54 keep track of resources and MCs respectively that are currently in a state in which control could be passed to another device. Additionally, resource-seeks-MC and MC-seeks-resource databases 62 and 56 maintain a list of resources and controllers that are seeking to control a mobile controller or resource respectively; but their requests, as yet, have gone unfulfilled. It will be appreciated that various other database schemes could be implemented to maintain a similar set of information about the room's devices and that the present invention should not be limited to the particular database scheme disclosed herein.

Figure 3:
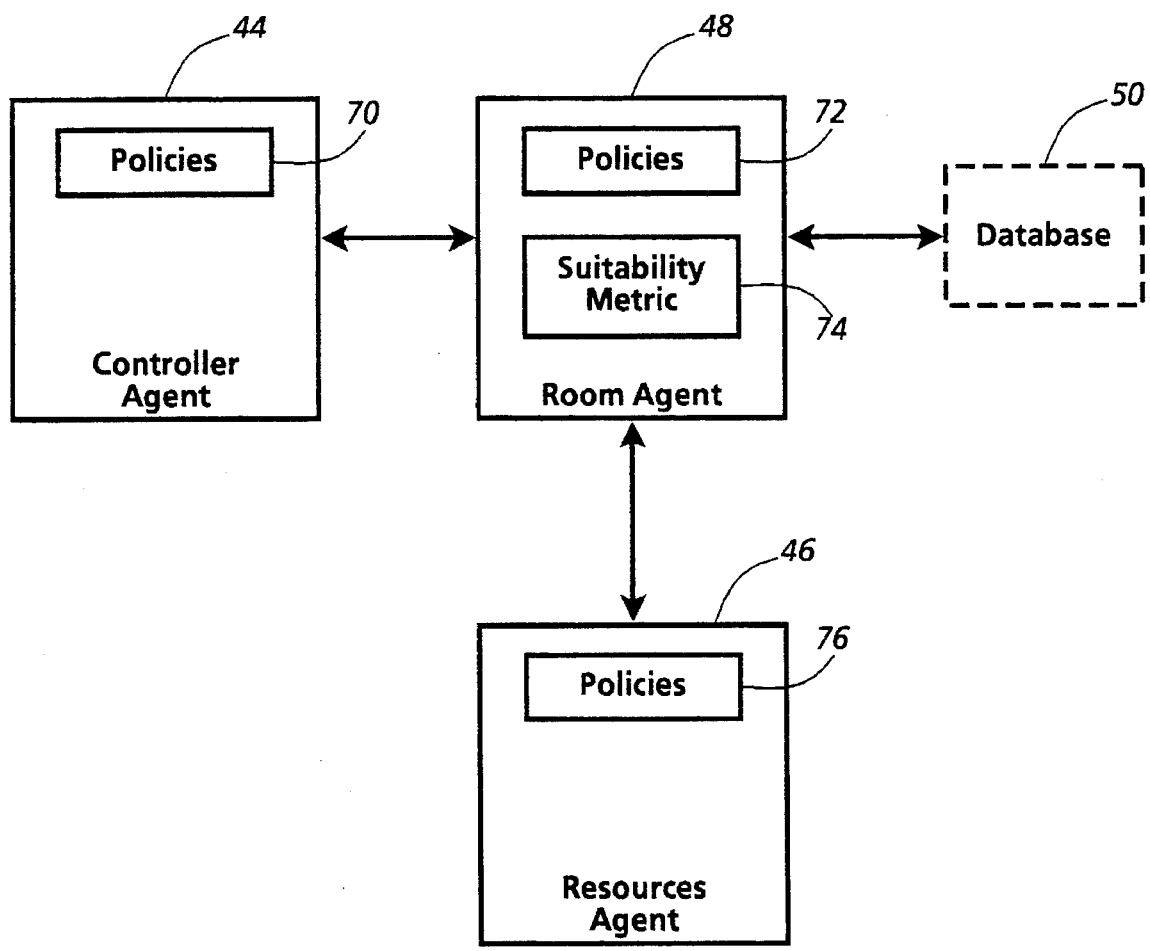
FIG. 3 is a diagram showing the lines of communication that might exist in a typical request by a controller agent for a resource.

Having discussed the overall architecture of this present embodiment, the manner in which requests are arbitrated and resources allocated will be described. FIG. 3 is a diagram showing the lines of communication that might exist in a typical request by a controller agent 44 for a resource. Controller agent 44 formulates a request for resources from either user input and/or its own internal policies 70. For example, for a given printing request, controller policy might decide that only a specific type of printer with certain characteristics can satisfy the request.

The request is then forwarded to the room agent 48. Room agent 48 also has room-level policies 72 that acts as a filter in processing various requests. For example, the room agent may guard against the "greedy user/controller" by enforcing the policy that no single user/controller may have more than a certain number of devices of a certain type (e.g. displays, printers, computational resources, etc.) allocated to it at a given time. If the request of the controller agent runs afoul of room-level policy, then the appropriate request denied message is sent back to the controller agent.

Other possible room-level policies may be formulated as priority queues for certain device. For example, the room's primary occupant may desire a higher priority for resources than visitors to the occupant's room.

Additionally, policy might be based in known interferences between devices. The room agent, for example, might not allow the radio and TV to be on simultaneously. It will be appreciated that the room-level policies herein specified is not an exhaustive list of policies or their forms and that the present invention should not be limited to those policies described herein.

A second filter that winnows down the potential set of resources that may satisfy a request is resource "availability". For any given request, the room agent consults its database 50 of available resources to fulfill the request. Resources may be either "available" or "unavailable" for their control to be allocated. A resource is available if it is not currently busy with some activity or is otherwise interruptible. Resource agents decide their availability status and register that status with the room agent. Resources agents may decide their availability based upon its own internal policies 76.

The policies of the room, controllers and resources may allow for a rich set of allocations to occur. For example, to facilitate multiple controller allocations, a resource may decide whether it may link to multiple controllers. For example, the lighting in a room may allow concurrent control by an unlimited number of controllers. Likewise, resources, such as printers, may "spool" requests from different controllers—thus, giving controllers the impression of constant availability. Likewise, one controller may link to many resources. For example, one controller could acquire multiple displays in order to present coordinated graphics on all displays simultaneously.

A third filter used in allocating resources to controllers is resource "suitability". Briefly, a resource is suitable if the resource is able to perform a requested task to a level acceptable to the requesting controller. Requests for resources have an associated "activity type" that is specified in the body of the request. As will be discussed below, the controller may specify a minimum level of competency expected of the matched resource to perform the request. For example, the request could specify a color printer that prints at over 100 pages per minute and that no less capabilities will do.

FIG. 4 depicts a suitability matrix that might be employed by the room agent. The matrix 80 plots various activity types 86 that resources might be asked to perform, such as color printing, graphics display, room illumination, and the like. Obviously, the listing of activity types may be as detailed as desired and that the examples shown in FIG. 4 are by no means exhaustive. Against these activity types, resource types 84 are plotted. A resource type might be a general description (e.g. black and white printer) or the exact device name (e.g. 5775 printer). The numerical entries 82 in the table are a weighted assessment of the resource type against the particular activity type. For example, the table may give a SPARC workstation a rating of "10" in performing the activity of "wordprocessing" ("10" being the most suitable, "0" being the least suitable rating). It will be appreciated that other methods for matching resources against a suitability metric, such as rule-based expert systems, exist and are well known to those skilled in the art.

In deciding whether to allocate a given resource to a requested activity type, the room agent checks the set of available resources against their suitability for a task and the optionally supplied threshold level of competency supplied by the controller. For example, if a controller wants a color print of a document and not a black and white print, the controller would request a color printer with a threshold value greater than 5. Only the 5775 printer in its room will satisfy such a request and the 5775 printer will be allocated if available.

On the other hand, if time is of the essence for receiving a printout, the controller could request a color printer with a threshold of "5" or less. In that case, the room agent would allocate the more suitable 5775 color printer, if available. Otherwise, the room agent would allocate the black and white printer, if it is currently available.

A more detailed discussion of a current implementation of the present invention will now be given in reference to the flow charts in FIGS. 5 through 10 and in reference to the pseudocode given below. As previously stated, the present invention comprises a method by which mobile, remote, adaptable controllers can optimally and dynamically control a multitude of resources within a given room such that policies determined for the room, controllers, and resources can be arbitrated in a manner that creates a meaningful work environment for users in the room. Furthermore this method allows the controller to dynamically choose one of various modes of operation, either singly or in combination, allowing the user of the controller a maximum of flexibility in interacting with the resources in the room.

In the current implementation, three modes of operation are given. Broadly, these modes are:

a) "MANUAL" MODE: A mode where information concerning the nature and state of all resources in the room is presented to the controller. The user of the controller then selects suitable resources to control until some further change in state.

b) "MC AUTOMATICALLY SEEKS A RESOURCE" MODE: A mode where the controller is engaged in an activity and seeks a resource to aid in that activity. The system chooses the most suitable available device in the room given various constraints placed on the choice.

c) "RESOURCE AUTOMATICALLY SEEKS A MC" MODE: A mode where the controller lets it be known that it is available to be a controller for resources looking for controllers. The system finds the most suitable resource among those currently looking for controllers to attach itself to the controller and to configure the controller for the purpose of having a user being able to control resource.

Figure 5:
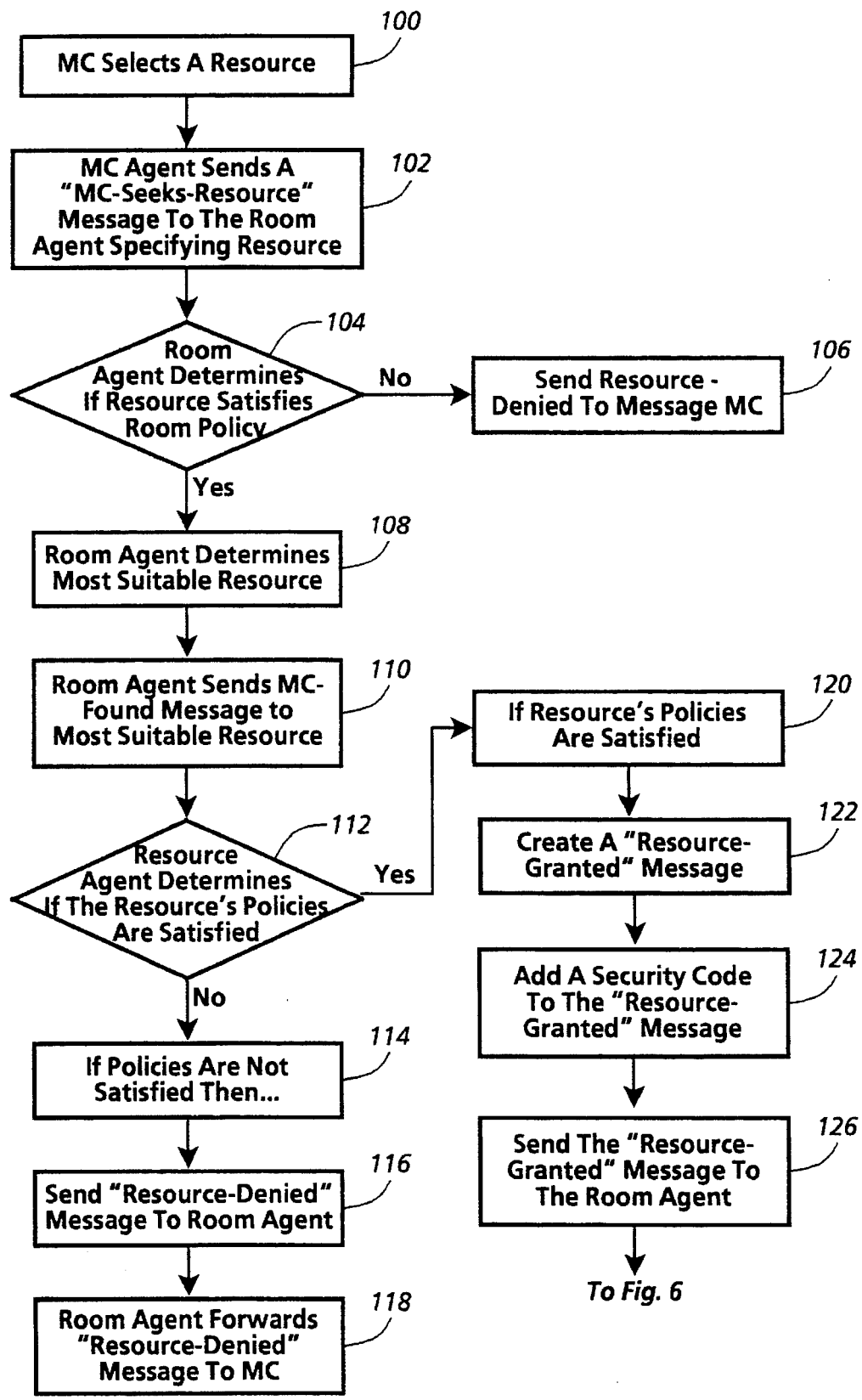
FIGS. 5 and 6 are flow charts summarizing the manual method of control allocation.
Figure 6:
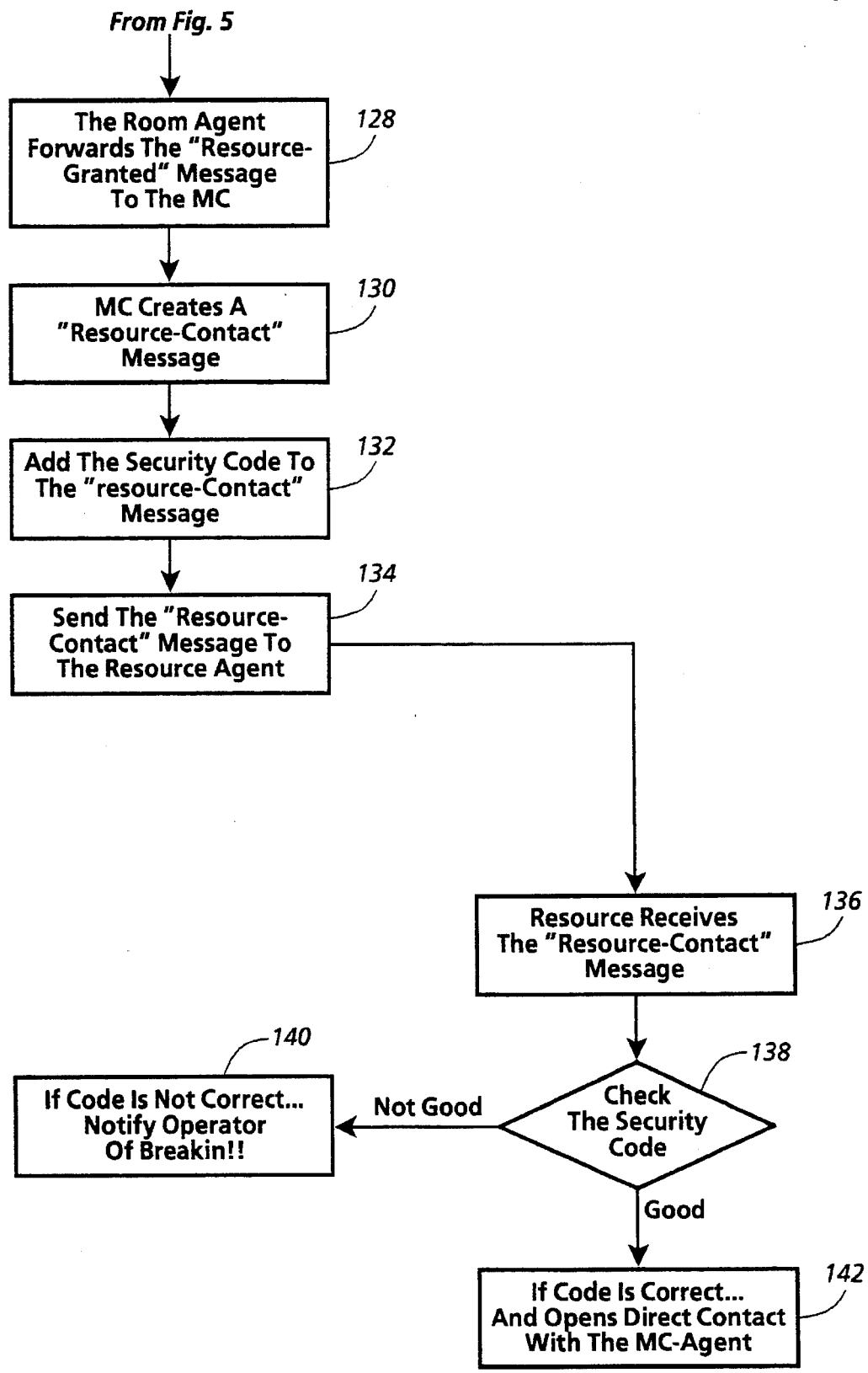

FIGS. 5 and 6 give a flow chart detailing the manual mode of resource allocation. Although the present implementation only allows the MC to make MANUAL requests, it can be appreciated that suitable changes to the pseudo code could enable other devices to make manual requests.

In a manual request, the MC agent determines that it would like to control a resource. The MC determines this from user interaction (for example, the user presses an icon) or from some calculation (for example, an automatic request based on time of day). The request can specify any combination of an ACTIVITY-TYPE, a DEVICE-TYPE or a specific DEVICE-NAME. For example, an ACTIVITY-TYPE might be "a high speed, black and white printing". A DEVICE-TYPE might be "a color monitor with sound". A DEVICE-NAME may be "a SPARC work station number 13.1.1.5". Any of these three parameters can be arbitrarily complex. Additionally, other parameters may be added without loss of generality.

The request is sent to the room agent. Using the ACTIVITY-TYPE, DEVICE-TYPE and DEVICE-NAME, the room agent creates a list which contains all possible resources that can satisfy these constraints. This list can contain many possible candidates, one candidate or none. If the list contains no candidates, the room agent sends a RESOURCE-DENIED message back to the requester.

The room agent then subjects the list to its room policy. For example, the room's primary occupant may install policies regarding interactions that the occupant has with visitors. Additionally, different rooms may have different policies: a conference room's policies might vary greatly from a cafeteria's policies.

The room policy acts as a filter and returns a subset of the list such that all members of the new list satisfy the room policy. If the list is empty, a RESOURCE-DENIED message is returned to the requester. If the list has greater than one member in it, it is further subjected to a suitability test. The suitability test returns a metric, say from "0" to "10", though other more complex metrics are possible, where "0" might mean "not suitable for the requested activity" and "10" is "perfectly suitable for the requested activity". The room agent selects the most suitable candidate. If no candidates are suitable the room agent returns a RESOURCE-DENIED message to the requester.

The room agent then forwards the request to the most suitable resource agent. The resource agent can either accept or reject the connection based on its own policies. At the simplest level, it may be already busy, and so reject the request. At a more complex level, the new request may be considered more important than its current connections, in which case, it will terminate its current connection and accept the new connection. If the resource is not busy, or can accept multiple connections, the resource agent will accept the connection. If the connection is denied, the resource agent sends the room agent a RESOURCE-DENIED message. If the connection is accepted the resource agent creates a security code number and attaches it to a RESOURCE-GRANTED message which it then sends to the room agent.

The room agent receives and then forwards either of these two responses to the requesting MC agent. If it is a denied message, the room agent continues trying other identified resources, in the order from most suitable to least suitable. MC is free to make a duplicate request in the future. If it is a granted message, the MC agent forms a RESOURCE-CONNECTION message and includes in it the security code passed to it by the room agent. This message is then sent directly to the resource agent. After the resource agent has verified the security code, full connection is established. This typically includes the resource sending the MC all "control panel" information, and the MC sending the resource information to rectify the resource to the current state of the MC. When connection is established both the MC and the resource agents send the room a STATE-CHANGE message indicating their new states.

Figure 7:
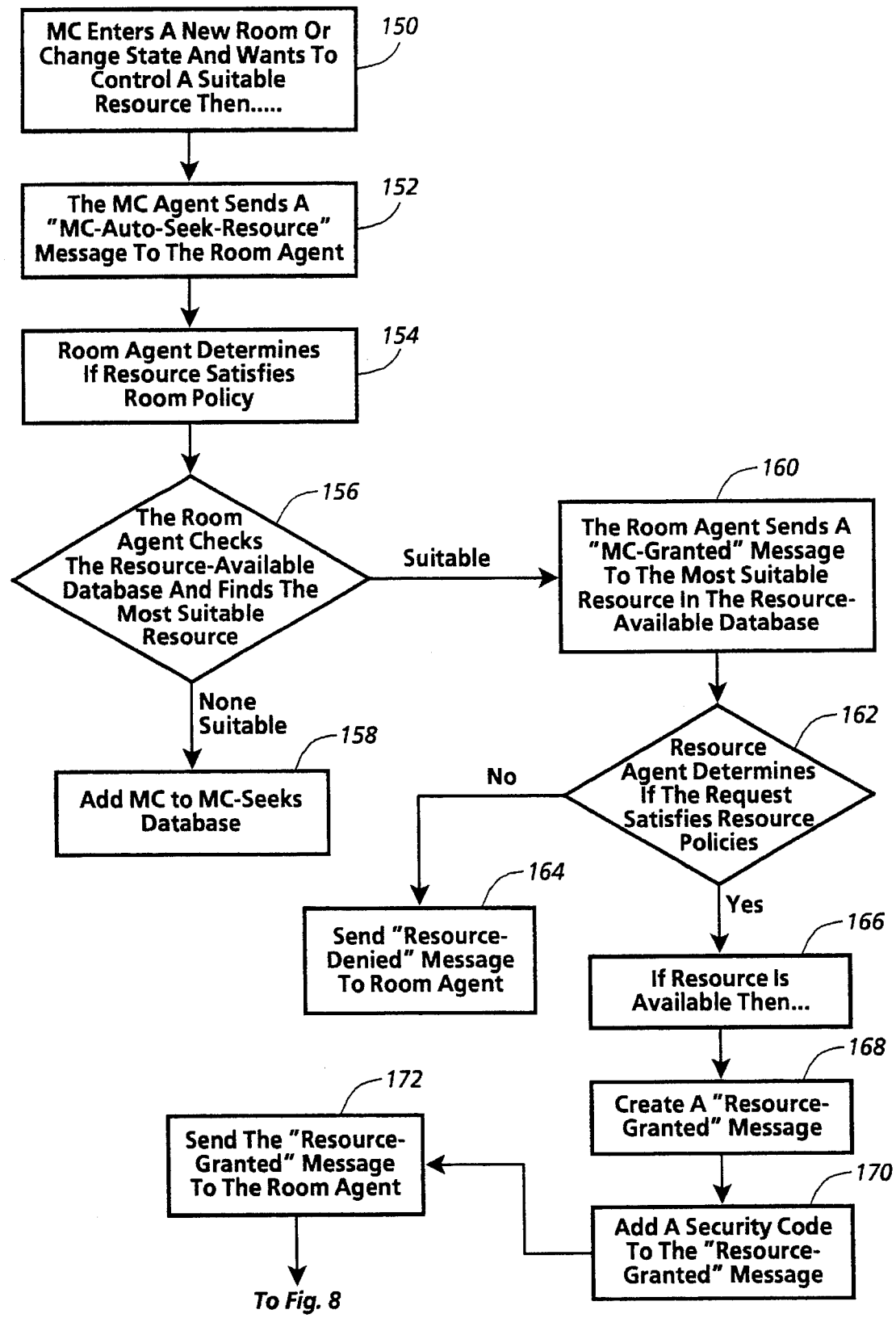
FIGS. 7 and 8 are flow charts summarizing the automatic, mobile controller-seeking-resource method of control allocation.
Figure 8:
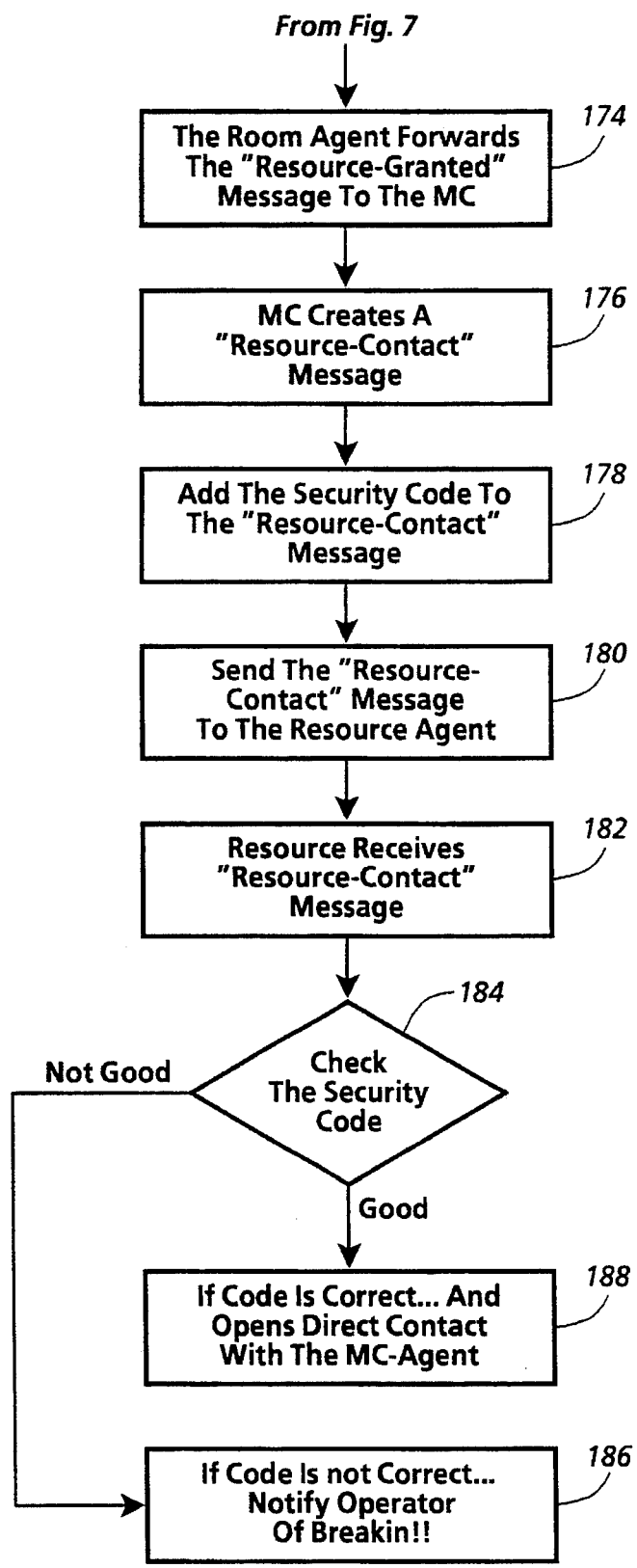
Figure 9:
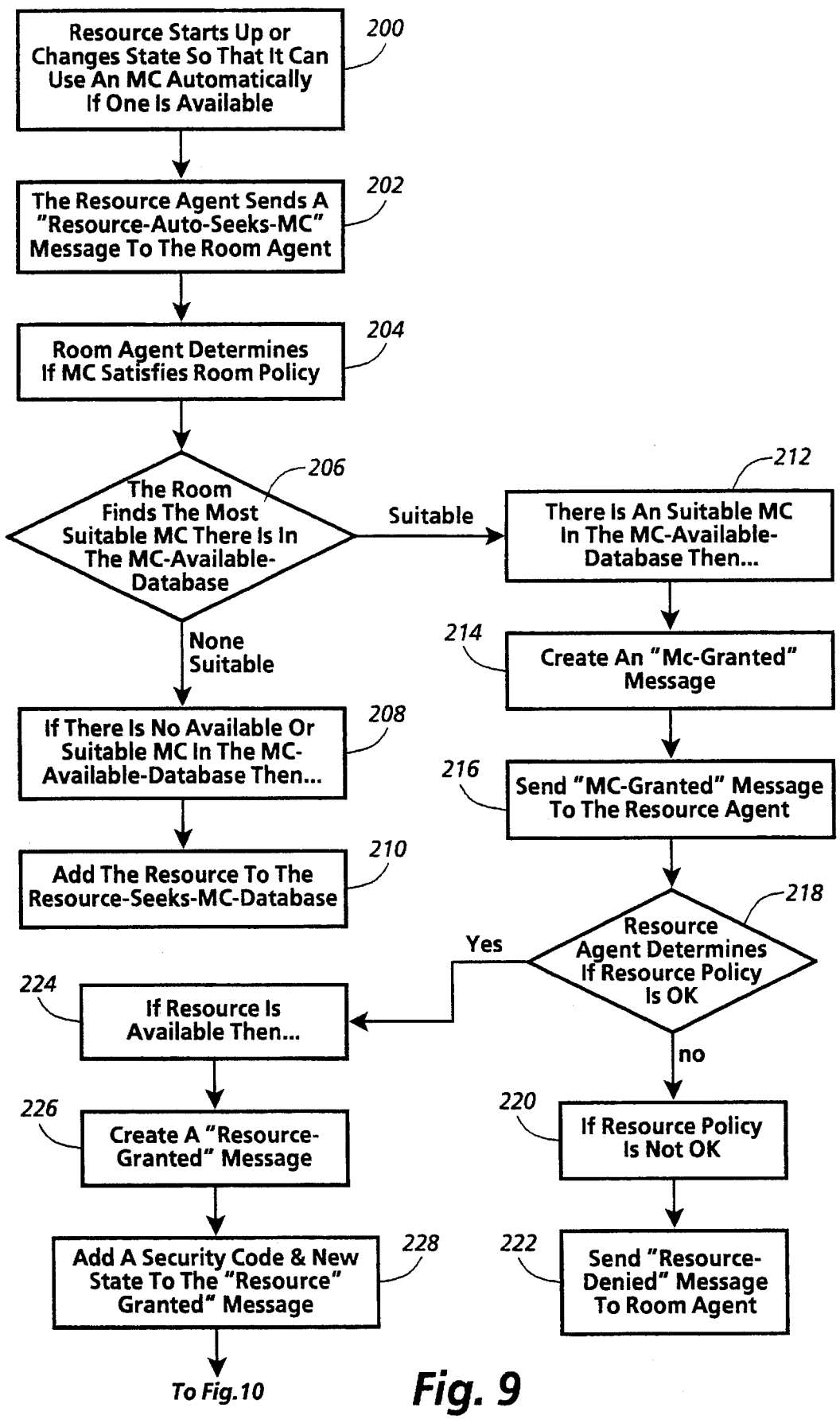
FIGS. 9 and 10 are flow charts summarizing the automatic, resource-seeks-mobile controller method of control allocation.
Figure 10:
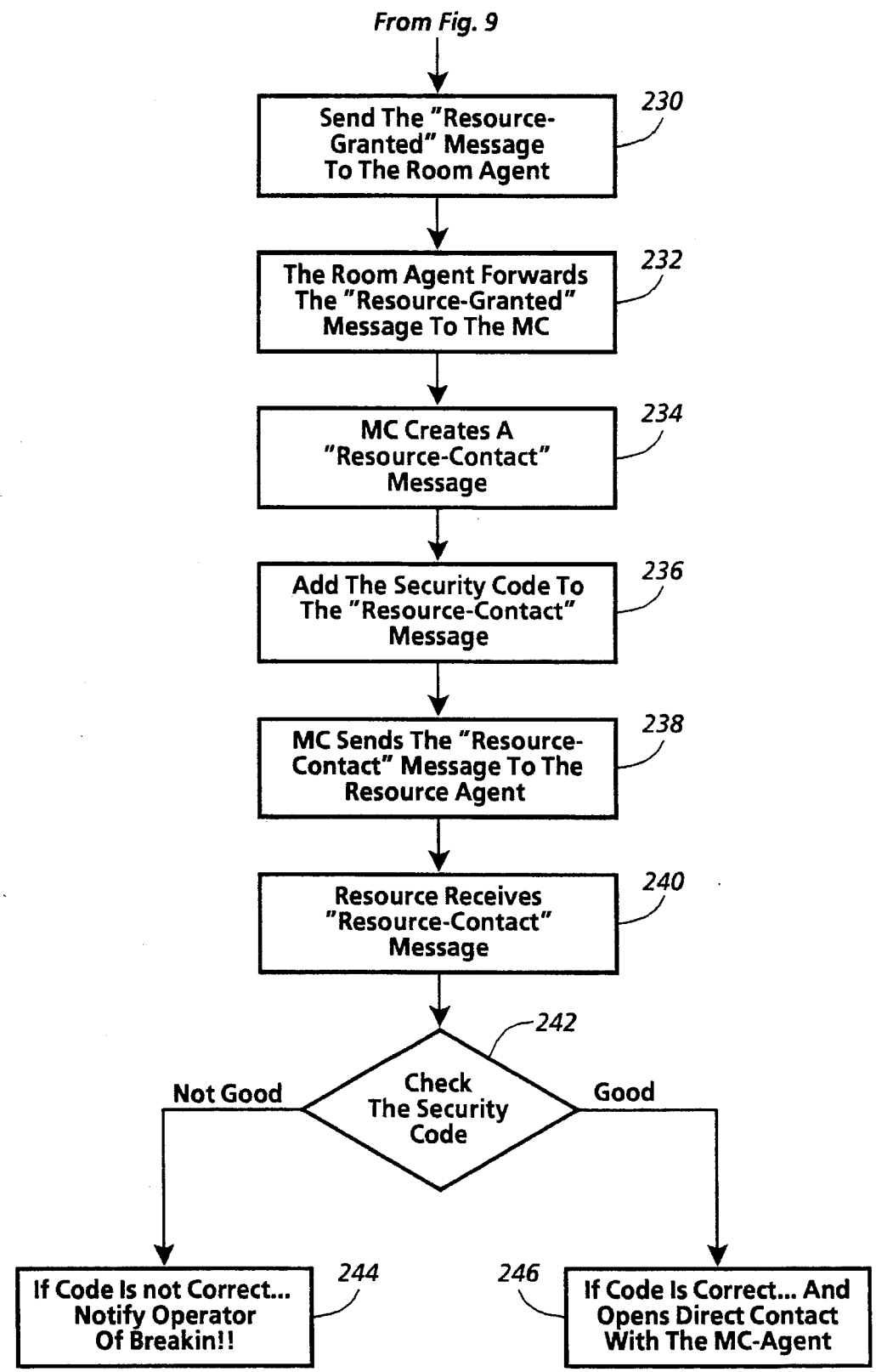

The second and third modes of request are AUTOMATIC modes which can be initiated by either a resource or a MC respectively. FIGS. 7 and 8 detail the "MC AUTOMATICALLY SEEKS A RESOURCE" mode in flow chart form. FIGS. 9 and 10 detail the "RESOURCE AUTOMATICALLY SEEKS A MC" mode. The purpose of these automatic modes is to help create a seamless work context as a mobile computer moves from room to room. They also create, in the case where resources are automatically seeking MCs, a "tacit", helpful environment where "correct" interactions automatically happen a goal of ubiquitous computing. In general, how MCs automatically connect with resources and how resources connection with MCs, are symmetrical and will be described once in terms of "MC SEEKING RESOURCES" mode. A parallel set of messages and databases exist for "RESOURCE SEEKING MC" mode.

Initially, two conditions must be satisfied in order for an automatic connection to be made between a MC and a resource. First, a resource agent must send to the room agent a RESOURCE-AVAILABLE message. The room agent will then place the resource into the RESOURCE-AVAILABLE database. Secondly, an MC must request an automatic connection with a resource. An MC does this by sending a MC-AUTO-SEEKS-RESOURCE message to the ROOM AGENT. This message also specifies the resource type desired by a combination of ACTIVITY-TYPE, DEVICE-TYPE and DEVICE-NAME fields. The request can also specify a "CUT-OFF" or threshold, metric below which a resource is deemed unsuitable. The message is sent to the room agent and the request is entered into the MC-SEEKS-RESOURCE database.

Whenever the RESOURCE-AVAILABLE or MC-SEEKS-RESOURCE databases change, the room agent determines if any "matches" have been made which both satisfy the MC's needs and the room's policies. The room agent checks each entry in the two databases to see if it satisfies the room's policies. If the entry passes this criteria, it determines a suitability metric for the entry. The room agent then determines the most suitable candidate and makes sure that it is above the CUT-OFF suitability.

If there are no matches, nothing happens. If a match is found to a suitable resource then a MC-FOUND message is sent to the resource. The resource agent can accept or deny this connection based on its own policies. At this point, the sequence of events is the same as in the manual mode. After the connection is made, the resource and MC may remove their names from the RESOURCE-AVAILABLE and MC-SEEKS-RESOURCE databases. If it is in the internal policies of either the respective MC or resource to allow multiple connections, then the respective name is not removed from the database.

To aid the understanding of one skilled in the art, a pseudo code description of a present embodiment is given below. Table I below details the operation of the room agent as it facilitates requests and messages between resources and mobile controllers. .As can be seen, the room agent, upon start up, initializes several databases and enters into an infinitely looping main process that receives and processes messages from either resources or mobile controllers.

TABLE 1

ROOM AGENT OPERATION

```
MAIN()
    INIT MC DATABASE
    INIT RESOURCE DATABASE
    INIT MC-SEEKS-RESOURCE DATABASE
    INIT RESOURCE-SEEKS-MC DATABASE
    INIT MC-AVAILABLE DATABASE
    INIT RESOURCE-AVAILABLE DATABASE
    BROADCAST A GENERAL WHO-IS-THERE MESSAGE TO ALL
    MCS AND RESOURCES
    WHILE (FOREVER)
```

TABLE 1-continued

ROOM AGENT OPERATION

```
/******Messages Coming In From MCS******/
/*State and context changes from MCS*/
IF MC-NEW MESSAGE IS RECEIVED
    FORM A NEW ENTRY IN MC DATABASE
    GET DEVICE-TYPE, DEVICE-NAME, USER-NAME FROM
      MESSAGE
    UPDATE ENTRY IN MC DATABASE
    DEVICE-LIST()
ELSE IF MC-STATE-CHANGE MESSAGE IS RECEIVED
    GET DEVICE-NAME FROM MESSAGE
    GET NEW CONNECTION INFORMATION FROM MESSAGE
    UPDATE ENTRY IN MC DATABASE WITH NEW
      CONNECTION INFORMATION
    DEVICE-LIST()
ELSE IF MC-GONE MESSAGE IS RECEIVED
    GET DEVICE-NAME FROM MESSAGE
    DELETE ENTRY IN MC DATABASE
    DEVICE-LIST()
/*An MC has decided to become available for automatic connections*/
ELSE IF MC-AVAILABLE MESSAGE IS RECEIVED
    GET DEVICE-NAME FROM THE MESSAGE
    ADD MC TO MC-AVAILABLE DATABASE
    CHECK-FOR-RESOURCES-SEEKING-MCS()
ELSE IF MC-NOT-AVAILABLE MESSAGE IS RECEIVED
    GET DEVICE-NAME FROM THE MESSAGE
    DELETE MC FROM THE MC-AVAILABLE DATABASE
    CHECK-FOR-RESOURCES-SEEKING-MCS()
/*An MC is seeking an automatic connection with a RESOURCE*/
ELSE IF MC-AUTO-SEEKS-RESOURCE MESSAGE IS RECEIVED
    GET DEVICE-NAME FROM THE MESSAGE
    GET THE DESIRED ACTIVITY-TYPE FROM THE MESSAGE
    GET THE DESIRED DEVICE-TYPE OR DEVICE-NAME
      FROM THE MESSAGE
    ADD MC AND INFORMATION TO MC-SEEKS-RESOURCE
      DATABASE
    CHECK-FOR-MC-SEEKING-RESOURCES()
ELSE IF MC-NOT-AUTO-SEEKS-RESOURCE MESSAGE IS
RECEIVED
    GET DEVICE-NAME FROM THE MESSAGE
    DELETE MC FROM THE MC-SEEKS-RESOURCES
    DATABASE
    CHECK-FOR-MC-SEEKING-RESOURCES()
/* An MC is seeking an immediate (manual) connection with a
RESOURCE*/
ELSE IF MC-SEEKS-RESOURCE MESSAGE IS RECEIVED
    GET DEVICE-NAME FROM THE MESSAGE
    GET THE DESIRED ACTIVITY-TYPE FROM THE MESSAGE
    GET THE DESIRED DEVICE-TYPE OR DEVICE-NAME
    FROM THE MESSAGE
    FORM A DEVICE-SPEC FROM THE INFORMATION
    RESOURCE-LIST = ROOM-POLICY-ROUTINE(DEVICE
    SPEC,'RESOURCE-DATABASE')
    FOR R IN RESOURCE-LIST
        MC-GRANTED = TRY-RESOURCES(RESOURCE-
        LIST,DEVICE-SPEC)
        IF MC-GRANT IS NOT NULL
            FORWARD MC-GRANTED TO MC
            BREAK FROM FOR LOOP
        ELSE IF CHECK IS NULL
            CONTINUE IN FOR LOOP
        END IF
    END FOR
/*An MC denied connection to a RESOURCE
ELSE IF RESOURCE-DENIED MESSAGE IS RECEIVED
    GET DEVICE-NAME FROM MESSAGE
    FORWARD MESSAGE TO THE RESOURCE
/*****Messages Coming in from Resources******/
/*Changes in state of RESOURCES*/
IF RESOURCE-NEW MESSAGE IS RECEIVED
    FORM A NEW ENTRY IN RESOURCE DATABASE
    GET DEVICE-TYPE, DEVICE-NAME, USER-NAME FROM
      MESSAGE
    UPDATE ENTRY IN RESOURCE DATABASE
    DEVICE-LIST()
ELSE IF RESOURCE-STATE-CHANGE MESSAGE IS RECEIVED
    GET DEVICE-NAME FROM MESSAGE
    GET NEW CONNECTION INFORMATION FROM MESSAGE
```

TABLE 1-continued

ROOM AGENT OPERATION

```
        UPDATE ENTRY IN RESOURCE DATABASE WITH NEW
            CONNECTION INFORMATION
        DEVICE-LIST()
    ELSE IF RESOURCE-GONE MESSAGE IS RECEIVED
        GET DEVICE-NAME FROM MESSAGE
        DELETE ENTRY IN RESOURCE DATABASE
        DEVICE-LIST()
    /*A RESOURCE has decided to become available for automatic
    connections*/
    ELSE IF RESOURCE-AVAILABLE MESSAGE IS RECEIVED
        GET DEVICE-NAME FROM THE MESSAGE
        ADD RESOURCE TO RESOURCE-AVAILABLE DATABASE
        CHECK-FOR-MCS-SEEKING-RESOURCES()
    ELSE IF RESOURCE-NOT-AVAILABLE MESSAGE IS RECEIVED
        GET DEVICE-NAME FROM THE MESSAGE
        DELETE MC FROM THE RESOURCE-AVAILABLE
        DATABASE
    /*A RESOURCE is seeking an automatic connection with a MC*/
    ELSE IF RESOURCE-AUTO-SEEKS-MC MESSAGE IS RECEIVED
        GET DEVICE-NAME FROM THE MESSAGE
        GET THE DESIRED ACTIVITY-TYPE FROM THE MESSAGE
        GET THE DESIRED DEVICE-TYPE OR DEVICE-NAME
        FROM THE MESSAGE
        ADD RESOURCE AND INFORMATION TO RESOURCE-
        SEEKS-MC DATABASE
        CHECK-FOR-RESOURCES-SEEKING-MCS()
    ELSE IF RESOURCE-NOT-AUTO-SEEKS-MC MESSAGE IS
    RECEIVED
        GET DEVICE-NAME FROM THE MESSAGE
        DELETE MC FROM THE RESOURCE-SEEKS-MC DATABASE
    /*A RESOURCE has denied a connection to a MC*/
    ELSE IF MC-DENIED MESSAGE IS RECEIVED
        GET DEVICE-NAME FROM MESSAGE
        FORWARD THE MC-DENIED MESSAGE TO MC AGENT
    END WHILE
END MAIN.
CHECK-FOR-RESOURCES-SEEKING-MCS()
    FOR R IN THE RESOURCE-SEEKING-MC DATABASE
        GET DEVICE-TYPE, USER-TYPE, ACTIVITY-TYPE FROM R
        FORM DEVICE-SPEC FROM THIS INFORMATION
        MC-LIST = ROOM-POLICY-ROUTINE(DEVICE-SPEC, 'MC-
        AVAILABLE')
        FOR M IN MC-AVAILABLE DATABASE
            FORM MC-GRANTED MESSAGE
            SEND MESSAGE TO RESOUCE R
            GET RESPONSE
            IF RESPONSE IS 'RESOURCE-GRANTED'
                FORWARD MESSAGE TO MC M
                BREAK FROM FOR LOOP
            END IF
    END FOR
END CHECK-FOR-RESOURCES-SEEKING-MCS.
CHECK-FOR-MCS-SEEKING-RESOURCES()
FOR M IN THE MC-SEEKING-RESOURCE DATABASE
        GET DEVICE-TYPE, USER-TYPE, ACTIVITY-TYPE FROM M
        FORM DEVICE-SPEC FROM THIS INFORMATION
        RESOURCE-LIST = ROOM-POLICY-ROUTINE(DEVICE-
        SPEC, 'RESOURCE-AVAILABLE')
        FOR R IN RESOURCE-LIST
            FORM MC-GRANTED MESSAGE
            SEND MESSAGE TO RESOUCE R
            GET RESPONSE
            IF RESPONSE IS 'RESOURCE-GRANTED'
                FOWARD MESSAGE TO MC M
                BREAK FROM FOR LOOP
            END IF
    END FOR
END CHECK-FOR-MCS-SEEKING-RESOURCES.
ROOM-POLICY-ROUTINE(DEVICE-SPEC,DEVICE-TYPE)
    /*Obtain a list of all devices that either the MC or the RESOURCE
    (depending on who is asking for the connection) that can be connected
    to. Typically this is either a DEVICE-TYPE or a single DEVICE-
    NAME.*/
    DEVICES = LIST OF ALL ALLOWABLE DEVICES FROM DEVICE-
    SPEC USING THE DATABASE SPECIFIED IN DEVICE-TYPE
    /* POLICY returns a list of all devices which are allowed to be
    connected to from the DEVICES list, given the policies of this room
```

TABLE 1-continued

ROOM AGENT OPERATION

```
and the DEVICE-SPEC. The DEVICE-SPEC includes the ACTIVITY-
TYPE, USER-TYPE AND DEVICE-TYPE. The policy can also use
knowledge of the types of connections as specified in the MC
DATABASE and the RESOURCE DATABASE.*/
DEVICES = POLICY(DEVICES, DEVICE-SPEC)
/*SUITABILITY returns a metric (a number) depending on the quality
of the match between the ACTIVITY-TYPE and the DEVICE-TYPE.
Typically each room maintains a SUITABILITY-TABLE that has this
information. A metric of "0" indicates that the device is not capable of
performing that activity. A metric of "10" indicates that it is the "best"
at performing the activity. The DEVICE-SPEC can contain a CUT-
OFF below which the DEVICES can be said to SUITABLE. Then order
this list such that the most suitable are first, and return this list.*/
NEW-LIST EQUALS NULL.
FOR D IN DEVICES
    METRIC = SUITABILITY(D,ACTIVITY-TYPE)
    IF METRIC > CUT-OFF THEN
        ADD D TO NEW-LIST
    END IF
END FOR
NEW-LIST = ORDER-LIST(NEW-LIST)/*Orders the list*/
RETURN NEW-LIST
END ROOM-POLICY-ROUTINE.
TRY-RESOURCES(RESOURCE-LIST, DEVICE-SPEC)
    FOR R IN RESOURCE-LIST
        FORM MC-GRANTED MESSAGE
        ADD DEVICE-SPEC
        SEND MESSAGE TO R
        GET RESPONSE
        IF THE RESPONSE IS RESOURCE-GRANTED MESSAGE
            RETURN RESOURCE-GRANTED MESSAGE
        END IF
    END FOR
    RETURN NULL
END TRY-RESOURCE.
DEVICE-LIST()
    SET MC-LIST TO EMPTY
    FOR ALL MCS IN MC DATABASE
        ADD NAME TO MC-LIST
    END FOR
    SET DEVICE-LIST TO EMPTY
    FOR ALL RESOURCES IN RESOURCE DATABASE
        ADD FULL ENTRY TO DEVICE-LIST
    END FOR
    FOR ALL MCS IN MC DATABASE
        ADD FULL ENTRY TO DEVICE-LIST
    END FOR
    FOR ALL MCS IN MC-LIST
        SEND DEVICE-LIST TO MC AGENT
    END FOR
END DEVICE-LIST.
END DEVICE-LIST.
```

Table 2 below details the operation of a mobile controller as implemented in the presently preferred embodiment.

TABLE 2

MOBILE CONTROLLER ("MC") AGENT OPERATION

```
MAIN()
    WHILE (FOREVER)
    /*If there are state or context changes tell the ROOM AGENT*/
    IF MC ENTERS INTO NEW ROOM
        USING INFRASTRUCTURE GET AND CACHE ROOM
        AGENT ADDRESS
        FORM MC-NEW MESSAGE
        ADD DEVICE-TYPE, DEVICE-NAME, USER-NAME
        SEND TO ROOM AGENT
    ELSE IF MC'S STATE CHANGES BY CONNECTING OR
    DISCONNECTING TO A RESOURCE
        FORM MC-STATE CHANGE MESSAGE
        ADD DEVICE-NAME
        ADD WHETHER IT IS CONNECT OR DISCONNECT
        ADD SECURITY-CODE OF CONNECTION/* for identification
```

TABLE 2-continued

MOBILE CONTROLLER ("MC") AGENT OPERATION

```
*/
        SEND TO ROOM AGENT
    ELSE IF MC LEAVES THE ROOM
        FORM A MC-GONE MESSAGE
        ADD DEVICE-NAME
        SEND TO THE ROOM AGENT
        /*If MC will accept automatic connections from RESOURCES*/
        ELSE IF THE MC DECIDES TO ACCEPT AUTOMATIC RESOURCE
        CONNECTIONS
        FORM MC-AVAILABLE MESSAGE
        ADD DEVICE-NAME
        SEND TO THE ROOM AGENT
        ELSE IF THE MC DECIDES TO NO LONGER ACCEPT
        AUTOMATIC RESOURCE CONNECTIONS
        FORM MC-NOT-AVAILABLE MESSAGE
        ADD DEVICE-NAME
        SEND TO THE ROOM AGENT
    /*If the MC is seeking automatic connection to a RESOURCE*/
    ELSE IF THE MC WISHES AN AUTOMATIC CONNECTION TO A
    RESOURCE
        FORM MC-AUTO-SEEKS-RESOURCE MESSAGE
        ADD DEVICE-NAME
        ADD ACTIVITY-TYPE DESIRED
        IF SPECIFIC RESOURCE TYPE IS DESIRED
            ADD DEVICE-TYPE DESIRED
        ELSE IF SPECIFIC RESOURCE DESIRED
            ADD DEVICE-NAME
        END IF
        SEND TO ROOM AGENT
    ELSE IF THE MC NO LONGER WISHES AN AUTOMATIC
    CONNECTION TO A RESOURCE
        FORM A MC-NOT-AUTO-SEEKS-RESOURCE MESSAGE
        ADD DEVICE-NAME
        SEND TO ROOM AGENT
    /*If the MC seeks a connection with a RESOURCE*/
    ELSE IF THE MC WISHES AN IMMEDIATE OR MANUAL
    CONNECTION TO A RESOURCE
        FORM A MC-SEEKS-RESOURCE MESSAGE
        ADD DEVICE-NAME
        ADD ACTIVITY-TYPE DESIRED
        IF SPECIFIC RESOURCE TYPE IS DESIRED
            ADD DEVICE-TYPE DESIRED
        ELSE IF SPECIFIC RESOURCE DESIRED
            ADD DEVICE-NAME
        END IF
        SEND TO ROOM AGENT
    /*If the MC receives a DEVICE-LIST from the ROOM AGENT*/
    ELSE IF THE MC RECEIVES A DEVICE-LIST FROM THE ROOM
    AGENT
        CACHE THE LIST OF DEVICES AND THEIR ATTRIBUTES
        IF MC WISHES TO DISPLAY THE LIST
            DISPLAY THE LIST
        END IF
    /*The MC has been granted a RESOURCE*/
    ELSE IF THE MC RECEIVES A RESOURCE-GRANTED MESSAGE
        FROM MESSAGE GET AND CACHE SECURITY-CODE
        FROM MESSAGE GET DEVICE-TYPE, DEVICE-NAME,
            ACTIVITY-TYPE & USER-TYPE OF RESOURCE
            AND FORM INTO RESOURCE-SPEC
        CHECK = MC-POLICY-ROUTINE(RESOURCE-SPEC)
        /*MC-POLICY-ROUTINE executes MC and user policies
        of connections.*/
        IF CHECK = YES
            FORM RESOURCE-CONNECTION MESSAGE
            ADD DEVICE-NAME
            ADD SECURITY-CODE TO MESSAGE
            SEND TO RESOURCE AGENT
            START FULL CONNECTION WITH RESOURCE
            FORM MC-STATE-CHANGE MESSAGE
            ADD DEVICE-NAME
            ADD WHETHER IT IS CONNECT OR DISCONNECT
            ADD SECURITY-CODE OF CONNECTION/* for
                identification*/
            SEND TO ROOM AGENT
        ELSE IF CHECK = NO
            FORM RESOURCE-DENIED MESSAGE
            ADD DEVICE-NAME
```

TABLE 2-continued

MOBILE CONTROLLER ("MC") AGENT OPERATION

```
            ADD SECURITY-CODE
            SEND TO ROOM AGENT
        END ELSE
    ELSE IF THE MC RECEIVES A RESOURCE-DENIED MESSAGE
        LET THE INTERESTED PARTIES KNOW
    ELSE IF THE MC RECEIVES A MC-DENIED MESSAGE
        LET THE INTERESTED PARTIES KNOW
    /*The MC gets a "ping" from the ROOM AGENT*/
    ELSE IF THE MC RECEIVES A WHO-IS-THERE MESSAGE
        FORM MC-NEW MESSAGE
        ADD DEVICE-TYPE, DEVICE-NAME, USER-NAME
        SEND TO ROOM AGENT
    END IF
    END WHILE
END MAIN.
```

Table 3 below describes in a greater detail the operation of resource agent in the presently preferred embodiment.

TABLE 3

RESOURCE AGENT OPERATION

```
MAIN()
    WHILE (FOREVER)
        IF RESOURCE ENTERS INTO NEW ROOM OR STARTS UP
            USING INFRASTRUCTURE GET AND CACHE ROOM
            AGENT ADDRESS
            FORM RESOURCE-NEW MESSAGE
            ADD DEVICE-TYPE, DEVICE-NAME, USER-NAME
            SEND TO ROOM AGENT
        ELSE IF RESOURCE'S STATE CHANGES BY CONNECTING OR
        DISCONNECTING TO A MC
            FORM RESOURCE-STATE CHANGE MESSAGE
            ADD DEVICE-NAME
            ADD WHETHER IT IS CONNECT OR DISCONNECT
            ADD SECURITY-CODE OF CONNECTION/* for identification
*/
            SEND TO ROOM AGENT
        ELSE IF RESOURCE LEAVES THE ROOM OR IS TURNED OFF
            FORM A RESOURCE-GONE MESSAGE
            ADD DEVICE-NAME
            SEND TO THE ROOM AGENT
        /*If Resource will accept automatic connections from MCS*/
        ELSE IF THE RESOURCE DECIDES TO ACCEPT AUTOMATIC MC
        CONNECTIONS
            FORM RESOURCE-AVAILABLE MESSAGE
            ADD DEVICE-NAME
            SEND TO THE ROOM AGENT
        ELSE IF THE RESOURCE DECIDES TO NO LONGER ACCEPT
        AUTOMATIC MC CONNECTIONS
            FORM RESOURCE-NOT-AVAILABLE MESSAGE
            ADD DEVICE-NAME
            SEND TO THE ROOM AGENT
        /*If the RESOURCE is seeking automatic connection to a MC*/
        ELSE IF THE RESOURCE WISHES AN AUTOMATIC
        CONNECTION TO A MC
            FORM RESOURCE-AUTO-SEEKS-MC MESSAGE
            ADD DEVICE-NAME
            ADD ACTIVITY-TYPE DESIRED
            IF SPECIFIC MC TYPE IS DESIRED
                ADD DEVICE-TYPE DESIRED
            ELSE IF SPECIFIC MC DESIRED
                ADD DEVICE-NAME
            END IF
            SEND TO ROOM AGENT
        ELSE IF THE RESOURCE NO LONGER WISHES AN AUTOMATIC
        CONNECTION TO A MC
            FORM A RESOURCE-NOT-AUTO-SEEKS-MC MESSAGE
            ADD DEVICE-NAME
            SEND TO ROOM AGENT
        /*The RESOURCE has been granted a MC */
        ELSE IF THE RESOURCE RECEIVES A MC-GRANTED MESSAGE
            FROM MESSAGE GET DEVICE-TYPE, DEVICE-NAME,
                ACTIVITY-TYPE & USER-TYPE OF RESOURCE
```

TABLE 3-continued

RESOURCE AGENT OPERATION

```
        AND FORM INTO MC-SPEC
        CHECK = RESOURCE-POLICY-ROUTINE(MC-SPEC)
        /* RESOURCE-POLICY-ROUTINE executes RESOURCE and
        user policies of connections.*/
        IF CHECK = YES
            FORM RESOURCE-GRANTED MESSAGE
            ADD DEVICE-NAME
            CREATE A SECURITY-CODE AND CACHE IT
            ADD SECURITY-CODE TO MESSAGE
            SEND TO ROOM AGENT
        ELSE IF CHECK = NO
            FORM MC-DENIED MESSAGE
            ADD DEVICE-NAME
            SEND TO ROOM AGENT
        END ELSE
    /* The RESOURCE gets a "ping" from the ROOM AGENT */
    ELSE IF THE RESOURCE RECEIVES A WHO-IS-THERE
MESSAGE
        FORM RESOURCE-NEW MESSAGE
        ADD DEVICE-TYPE, DEVICE-NAME, USER-NAME
        SEND TO ROOM AGENT
    /*The RESOURCE receives a connection from a MC*/
    ELSE THE RESOURCE RECEIVES A RESOURCE-CONNECT
    FROM A MC
        GET SECURITY-CODE FROM MESSAGE
        IF SECURITY-CODE IS NOT VALID
            CONTACT OPERATOR ABOUT SECURITY VIOLATION
        ELSE
            OPEN FULL CONNECTION WITH MC
            SEND CONTROL INFORMATION TO MC
            RECTIFY STATE OF RESOURCE TO MC
            /*Might require multiple messages*/
            FORM RESOURCE-STATE-CHANGE MESSAGE
            ADD DEVICE-NAME
            ADD WHETHER ITS CONNECT OR DISCONNECT
            ADD SECURITY-CODE OF CONNECTION
            SEND TO ROOM AGENT
        END IF
    END IF
    ELSE IF THE RESOURCE RECEIVES A RESOURCE-DENIED
    MESSAGE
        GET SECURITY-CODE FROM THE MESSAGE
        LET INTERESTED PARTIES KNOW
    END WHILE
END MAIN.
```

In summary, the present invention comprises a method by which mobile, remote, adaptable controllers can dynamically control a multitude of resources within a given region (e.g. a room) such that policies determined for the region, controllers, and resources can be arbitrated in a manner that creates a meaningful work environment for users in the region. Furthermore, this method allows a controller to dynamically choose one of various modes of operation, either singly or in combination, allowing the user of the controller a maximum of flexibility in interacting with the resources in the region.

Three modes of allocation have been described in relation to the presently claimed method: manual mode, and two automatic modes. The manual mode allows users, having access to controllers, to select among various resources that are available and meet region-level policies. The two automatic modes give the user a seamless computing environment by allowing controllers and resources to automatically connect to one another. The automatic allocations are performed with respect to region-level policies and with respect to the availability and suitability of devices.

This method maximizes the control of the resources of a region such that the control of the most suitable resources is dynamically situated in the hands of the user on an adaptable mobile controller.

What is claimed:

1. A method for servicing requests for resources by mobile controllers located in a partitioned communication cell, said partitioned communication cell having a set of interaction policies that constrain the granting of requests for resources, with stationary controllers and mobile controllers located in the partitioned communication cell defining a first membership set and stationary and mobile resources in said partitioned communication cell defining a second membership set, said method comprising the steps of identifying stationary controllers, mobile controllers, stationary resources, and mobile resources present within the partitioned communication cell to define said first and said second membership sets, including the step of dynamically updating said first and said second membership sets as mobile controllers and mobile resources enter and exit said partitioned communication cell;

registering interaction requests with a room agent made by mobile controllers located in the partitioned communication cell;

identifying contextual attributes within the partitioned communication cell of each of said interaction requests made to the room agent;

granting said interaction requests made to the room agent for utilization of mobile resources and stationary resources located within the partitioned communication cell when the identified contextual attributes are consistent with said partitioned communication cell interaction policies; and denying interaction requests having contextual attributes inconsistent with said partitioned communication cell interaction policies.

2. A system for servicing requests for resources by mobile controllers, said system comprising a plurality of stationary resources and a mobile resources present within a partitioned communication cell, at least one mobile controller movable into the partitioned communication cell, the mobile controller having a control signal mechanism for generating control request signals to control the stationary resources or the mobile resources, with the range of said control request signals substantially limited to the partitioned communication cell, and a room agent for receiving and acting upon said control request signals, with the room agent dynamically determining availability of both mobile resources entering and exiting said partitioned communication cell and stationary resources present in said partitioned communication cell, the room agent being configured to grant said control request signals from said mobile controller for utilization of mobile and stationary resources located within the partitioned communication cell in accordance with predetermined contextual attributes defined within the partitioned communication cell.

\* \* \* \* \*